United States Patent
Han et al.

(10) Patent No.: US 9,045,671 B2
(45) Date of Patent: Jun. 2, 2015

(54) ACRYLIC PRESSURE-SENSITIVE ADHESIVE COMPRISING OPTICALLY ANISOTROPIC COMPOUND, POLARIZING PLATE AND LIQUID CRYSTAL DISPLAY INCLUDING THE SAME

(75) Inventors: In Cheon Han, Seoul (KR); Ki Seok Jang, Daegu (KR); Min Soo Park, Daejeon (KR); Min Jin Ko, Daejeon (KR); Bum Gyu Chol, Daejeon (KR); Ik Hwan Cho, Daejeon (KR); Ki Youl Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 361 days.

(21) Appl. No.: 12/865,109

(22) PCT Filed: Feb. 2, 2009

(86) PCT No.: PCT/KR2009/000510
§ 371 (c)(1),
(2), (4) Date: Nov. 19, 2010

(87) PCT Pub. No.: WO2009/096758
PCT Pub. Date: Aug. 6, 2009

(65) Prior Publication Data
US 2011/0051051 A1    Mar. 3, 2011

(30) Foreign Application Priority Data

Feb. 1, 2008 (KR) .................. 10-2008-0010490
Feb. 1, 2008 (KR) .................. 10-2008-0010493
Feb. 4, 2008 (KR) .................. 10-2008-0011301

(51) Int. Cl.
*C08K 5/00* (2006.01)
*C09J 133/08* (2006.01)
*C08F 220/18* (2006.01)

(52) U.S. Cl.
CPC ....... *C09J 133/08* (2013.01); *C08F 2220/1825* (2013.01)

(58) Field of Classification Search
USPC .................. 428/355 R; 524/81, 359, 369
See application file for complete search history.

(56) References Cited

U.S. PATENT DOCUMENTS

| 7,175,779 B1* | 2/2007 | Kricheldorf et al. ...... 252/299.01 |
| 2003/0054166 A1* | 3/2003 | Chang et al. ............ 428/355 AC |
| 2006/0275939 A1* | 12/2006 | Yokoyama et al. ............. 438/48 |
| 2010/0130659 A1* | 5/2010 | Lee et al. ...................... 524/288 |
| 2010/0137484 A1* | 6/2010 | Cheong et al. ................ 524/172 |

FOREIGN PATENT DOCUMENTS

| JP | 9-302070 A | 11/1997 |
| JP | 10279907 A * | 10/1998 |
| JP | 11-349947 A | 12/1999 |
| JP | 2002-194303 A | 7/2002 |
| JP | 2004-516359 | 6/2004 |
| JP | 2007-518862 | 4/2007 |
| JP | 2008-144125 A | 6/2008 |
| KR | 10-2005-006120 A | 1/2005 |
| KR | 10-2005-0085714 A | 8/2005 |
| TW | 1234580 | 6/2005 |
| TW | 200722801 | 6/2007 |
| TW | 200728424 | 8/2007 |
| WO | WO 2007046276 A1 * | 4/2007 |
| WO | WO 2008/010650 | 1/2008 |
| WO | WO 2008150093 A2 * | 12/2008 |

OTHER PUBLICATIONS

Machine translation of JP 10279907 A.*

* cited by examiner

*Primary Examiner* — Wenwen Cai
(74) *Attorney, Agent, or Firm* — McKenna Long & Aldridge, LLP

(57) ABSTRACT

Disclosed are (A) an acrylic pressure-sensitive adhesive; and (B) an acrylic pressure-sensitive adhesive comprising an optically anisotropic compound having at least one substituent which contains an alkyl group, alkenyl group or alkynyl group at a meta-position of a mesogen. A polarizing plate and a liquid crystal display using the same are also disclosed. The optically anisotropic compound ensures excellent compatibility with the adhesive and high birefringence. Thus, main properties such as adhesion, reliability and durability in the conditions of high temperatures or high temperatures and high humidity are not worsened. Moreover light leakage is prevented by efficiently controlling the birefringence caused by shrinkage stress of the polarizing plate.

17 Claims, No Drawings

ACRYLIC PRESSURE-SENSITIVE ADHESIVE COMPRISING OPTICALLY ANISOTROPIC COMPOUND, POLARIZING PLATE AND LIQUID CRYSTAL DISPLAY INCLUDING THE SAME

This application is a National Stage Entry of International Application No. PCT/KR2009/000510, filed Feb. 2, 2009, and claims the benefit of Korean Application Nos. 10-2008-0010490, filed on Feb. 1, 2008, 10-2008-0010493, filed on Feb. 1, 2008, and 10-2008-0011301, filed on Feb. 4, 2008, which are hereby incorporated by reference for all purposes as if fully set forth herein.

TECHNICAL FIELD

The present invention relates to an acrylic pressure-sensitive adhesive composition comprising (A) an acrylic copolymer and (B) an optically anisotropic compound having one or more substituents containing one of an alkyl group, an alkenyl group, and an alkynyl group in a meta position of mesogen, and more particularly, to an acrylic pressure-sensitive adhesive composition comprising an optically anisotropic compound which has high optical anisotropy and superior endurance reliability under a high temperature or high temperature and high humidity condition due to excellent compatibility with a pressure-sensitive adhesive, and improves light leakage by effectively controlling birefringence occurring due to shrinkage of a polarizer, a polarizer and a liquid crystal display (LCD) device comprising the same.

BACKGROUND ART

In preparing liquid crystal display (LCD) device, liquid crystal cell comprising liquid crystal, and polarizer are basically required, and suitable adhesive layer or pressure-sensitive adhesive layer may be used for binding them. In addition, for improving functions of LCD device, a phase retardation plate, a compensation plate for wide view angle, a brightness enhancing film, and the like may be used, with additionally adhered to the polarizer.

As a main structure, LCD device generally includes a uniformly aligned liquid crystal layer; a polarizer with a multilayer structure, incorporated into a pressure-sensitive adhesive layer or an adhesive layer, based on a liquid crystal cell consisting of a transparent glass plate or a plastic sheet material containing a transparent electrode layer; a phase retardation plate; an additional functional film layer; and the like.

The polarizer may include an iodine compound or a dichroic polarizing material aligned in a certain direction, in this case, to protect these polarizing elements, multi-layers may be formed on both sides using a protective film such as triacetyl cellulose (TAC). In addition, the polarizer may additionally include a compensation film for wide view angle such as a phase retardation film or a liquid crystal type film in a shape having a unidirectional molecular alignment.

The aforementioned films are made of materials having different molecular structures and compositions, and thereby have different physical properties. In particular, under a high temperature or high temperature and high humidity condition, the dimensional stability according to shrinkage or expansion of materials having a unidirectional molecular alignment is insufficient. As a result, if the polarizer is fixed by a pressure-sensitive adhesive, then stress is concentrated on a TAC layer by shrinkage or expansion of the polarizer under a high temperature or high temperature and high humidity condition, leading to birefringence and thus light leakage. In this case, overall, negative birefringence occurs due to the shrunk TAC layer.

The light leakage phenomenon can be suppressed by preventing generation of residual stress with regulation of a stress releasing characteristic of the pressure-sensitive adhesive fixed on the polarizer. This can be achieved when the used pressure-sensitive adhesive has a non-crosslinked structure.

Traditionally, a pressure-sensitive adhesive layer have been used in the form of a partially crosslinked viscoelastic material to have a good high-temperature cohesive strength, thereby maintaining endurance reliability and showing suitable pressure-sensitive adhesive properties.

However, such a pressure-sensitive adhesive layer used in the form of a partially crosslinked viscoelastic material has residual stress under given stress and high polymers in the crosslinked structure are aligned in a particular direction, resulting in birefringence. In this alignment, an acrylic pressure-sensitive adhesive shows negative birefringence.

With a recent tendency to increase the size of LCD panel, the size of polarizer is also increasing, whereby the shrinkage of the polarizer is also to be increased and the residual stress of a pressure-sensitive adhesive layer is also to be increased under a heat resistance or moisture resistance condition. It results in large negative birefringence and severe light leakage. To minimize the light leakage phenomenon, it is necessary to perform optical compensation which regulates negative birefringence of the pressure-sensitive adhesive resulting from the residual stress into positive birefringence.

To perform the optical compensation, it is important to cause the pressure-sensitive adhesive to show positive birefringence under the residual stress by using a compound having high optical anisotropy and superior compatibility with the pressure-sensitive adhesive.

As an approach to improve the light leakage phenomenon, Japanese Unexamined Patent Publication No. 1998-279907 discloses a method for improving the light leakage phenomenon by mixing a high molecular weight acrylic polymer and a low molecular weight acrylic polymer having a molecular weight of less than 30,000 to provide a stress releasing characteristic generated from a polarizer. In this method, however, the effect of improving the light leakage phenomenon is not satisfactory as the size of the polarizer increases, the cutting characteristic is degraded due to low modulus, and the endurance reliability is reduced during long-term use.

Korean Patent Publication No. 2003-0069461 discloses a technical idea in which 0.01 to 40 parts by weight of a low molecular weight material representing positive birefringence under residual stress is mixed into an acrylic pressure-sensitive adhesive layer to correct negative birefringence of the acrylic pressure-sensitive adhesive layer which represents under residual stress. However, the low molecular weight material used herein has some problem in its compatibility with the high molecular weight copolymer and thus is likely to undergo phase separation with the high molecular weight copolymer when being used by a large amount, and may also have some problem in light transmission or endurance.

As the above, a stress releasing function is generally provided to a pressure-sensitive adhesive by adding a plasticizer or a low molecular weight material to a high molecular weight copolymer or by regulating a crosslinking structure, so as to improve light leakage. However, it is difficult to completely suppress the light leakage phenomenon merely by stress release.

That is, since a partial-crosslinking structure has to be introduced to pressure-sensitive adhesive for a polarizer in order to maintain the endurance reliability of the pressure-sensitive adhesive, the residual stress of the pressure-sensitive adhesive, resulting from the crosslinking structure, cannot be entirely removed. As a result, a traditional acrylic pressure-sensitive adhesive layer has negative birefringence under the residual stress, which is a major factor that makes it difficult to improve the light leakage phenomenon, together with negative birefringence of a TAC layer of a shrunk polarizer.

DISCLOSURE

Technical Problem

To solve the problems of the prior art as described above, an object of the present invention is to provide an acrylic pressure-sensitive adhesive composition comprising an optically anisotropic compound, which has a superior compatibility with an acrylic copolymer and high optical anisotropy, and regulates the pressure-sensitive adhesive to have positive birefringence under residual stress without any change in major properties, such as endurance reliability, which can be generated under a high temperature or high temperature and high humidity condition, thereby improving a light leakage phenomenon.

Another object of the present invention is to provide a polarizer comprising the pressure-sensitive adhesive composition.

Further another object of the present invention is to provide a liquid crystal display (LCD) device comprising the polarizer.

Technical Solution

In order to achieve the above objects, the present invention provides an acrylic pressure-sensitive adhesive composition comprising (A) acrylic copolymer and (B) an optically anisotropic compound comprising one or more substituents containing one of an alkyl group, an alkenyl group, and an alkynyl group in a meta position of mesogen.

The present invention also provides a polarizer comprising a polarization film and a pressure-sensitive adhesive layer formed on one side or both sides of the polarization film and containing the pressure-sensitive adhesive composition.

The present invention also provides a liquid crystal display (LCD) device comprising a liquid crystal panel in which the polarizer is attached onto one side or both sides of a liquid crystal cell.

Advantageous Effects

The acrylic pressure-sensitive adhesive composition according to the present invention includes a compound having superior compatibility with an acrylic copolymer and high optical anisotropy to effectively control a birefringence property generated by the shrinkage stress of a polarizer and introduces a crosslinking structure to maximize a stress releasing function of the pressure-sensitive adhesive, thereby improving the light leakage phenomenon of the polarizer without changing major properties, such as an endurance reliability of the pressure-sensitive adhesive, which can be generated under a high temperature or high temperature and high humidity condition.

In addition, the acrylic pressure-sensitive adhesive composition according to the present invention may additionally include a low molecular weight material or a plasticizer, and thereby provide more excellent stress releasing function.

BEST MODE

The present invention relates to an acrylic pressure-sensitive adhesive composition comprising (A) an acrylic copolymer and (B) an optically anisotropic compound comprising one or more substituents containing one of an alkyl group, an alkenyl group, and an alkynyl group in a meta position of mesogen.

In the present invention, a compound having high optical anisotropy is introduced to a pressure-sensitive adhesive representing negative birefringence under residual stress to cause the pressure-sensitive adhesive to have positive birefringence under the residual stress, thereby optically compensating for negative birefringence present in a triacetyl cellulose (TAC) layer of a shrunk polarizer and thus improving a light leakage phenomenon.

(A) Acrylic Copolymer

In the present invention, the acrylic copolymer (A) is not specifically limited if it can be generally used as a pressure-sensitive adhesive in the art.

In general, compounds having large birefringence are highly likely to be crystallized and have low compatibility with high polymer resin. As a result, even though the compounds are added to a pressure-sensitive adhesive by a small amount, a phase separation is generated and the compounds are crystallized, thus being precipitated.

However, an optically anisotropic compound comprising one or more substituents containing one of an alkyl group, an alkenyl group, and an alkynyl group in a meta position of mesogen according to the present invention has superior physical properties such as compatibility with high polymer resin, solubility, and a melting point.

Therefore, the acrylic pressure-sensitive adhesive composition according to the present invention introduces a compound having high optical anisotropy to a pressure-sensitive adhesive representing negative birefringence under residual stress to cause the pressure-sensitive adhesive to have positive birefringence under the residual stress, thereby optically compensating for negative birefringence present in a TAC layer of a shrunk polarizer and thus improving the light leakage phenomenon.

The acrylic copolymer (A) may include, but not limited to, for example, i) a (meth) acrylic acid ester monomer having an alkyl group of 1 to 14 carbon atoms; and ii) a crosslinking functional group-containing monomer.

When the carbon number of alkyl group is out of the range, the glass transition temperature (Tg) of the pressure-sensitive adhesive is increased, or regulation of the adhesive property may be difficult.

The content of the (meth) acrylic acid ester monomer i) having alkyl of 1 to 14 carbon atoms may be 90 to 99.9 parts by weight, based on 100 parts by weight of the acrylic copolymer (A) for regulation of pressure-sensitive adhesive strength and cohesive strength.

Examples of i) the (meth) acrylic acid ester monomer having alkyl of 1 to 14 carbon atoms may include, but not limited to, methyl (meth) acrylate, ethyl (meth) acrylate, n-propyl (meth)acrylate, isopropyl (meth)acrylate, butyl (meth)acrylate, t-butyl (meth)acrylate, pentyl (meth)acrylate, 2-ethylhexyl (meth)acrylate, n-octyl (meth)acrylate, isooctyl (meth) acrylate, isononyl (meth)acrylate, lauryl (meth)acrylate, tetradecyl (meth)acrylate, and the like, and they can be used alone or in a mixture of two or more kinds thereof.

The content of the crosslinking functional group-containing monomer ii) may be 0.1 to 10 parts by weight based on 100 parts by weight of the acrylic copolymer (A). If the content is less than 0.1 parts by weight, destruction of cohesion is likely to occur under a high temperature or high humidity condition and an improving effect of the adhesive strength may be insignificant. If the content is more than 10 parts by weight, the pressure-sensitive adhesive property and peel strength may be degraded.

Examples of the crosslinking functional group-containing monomer ii) may include, but not limited to, a hydroxyl group-containing monomer such as 2-hydroxyethyl (meth) acrylate, 2-hydroxypropyl (meth)acrylate, 4-hydroxybutyl (meth)acrylate, 2-hydroxyethyleneglycol (meth)acrylate, or 2-hydroxypropyleneglycol (meth)acrylate; a carboxyl group-containing monomer such as acrylic acid, methacrylic acid, acrylic acid dimer, itaconic acid, carboxyethylacrylate, carboxypenthylacrylate, maleic acid, or fumaric acid; and a nitrogen-containing monomer such as acryl amide, N-vinyl pyrrolidone, or N-vinyl caprolactam, and they can be used alone or in a mixture of two or more kinds thereof.

The acrylic copolymer (A) may be an acrylic copolymer containing an aromatic group.

Herein, the aromatic-group containing acrylic copolymer may include, but not limited to, i) a (meth)acrylic acid ester monomer having an alkyl group of 1 to 14 carbon atoms; ii) a crosslinking functional group-containing monomer; and iii) an aromatic group-containing acrylic monomer that can be copolymerized with the alkyl (meth) acrylic acid ester monomer.

In the aromatic-group containing acrylic copolymer, the content of the (meth) acrylic acid ester monomer i) having an alkyl group of 1 to 14 carbon atoms may be 55 to 95 parts by weight based on 100 parts by weight of the acrylic copolymer.

If the content is less than 55 parts by weight, the amount of aromatic group-containing acrylic monomer iii) is relatively increased, and thus it is difficult to obtain sufficient molecular weight and the Tg of the pressure-sensitive adhesive is increased, thereby making it difficult to exhibit pressure-sensitive adhesion performance suitable for purposes. If the content exceeds 95 parts by weight, the amount of aromatic group-containing acrylic monomer iii) is relatively decreased, and thereby may be insufficient to obtain satisfactory optical compensation effect.

Since the aromatic group-containing acrylic monomer iii) that can be copolymerized with the alkyl (meth) acrylic acid ester monomer represents positive birefringence, it may correct the negative birefringence of the acrylic pressure-sensitive adhesive under residual stress.

The aromatic group-containing acrylic monomer iii) may be a compound expressed by Formula 1:

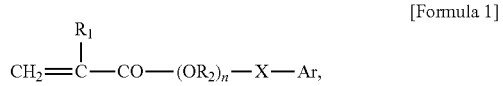

[Formula 1]

where $R_1$ indicates hydrogen or a methyl group, $R_2$ indicates an alkylene group of 1 to 12 carbon atoms, n indicates an integer of 0 to 3, preferably 0 or 1, X indicates oxygen, sulfur, or an alkylene group of 1 to 4 carbon atoms, and Ar indicates an aromatic group unsubstituted or substituted with halogen or alkyl of 1 to 12 carbon atoms.

The compound expressed by Formula 1 may be, for example, phenoxy ethyl (meth)acrylate, benzyl (meth)acrylate, 2-phenylthio-1-ethyl (meth)acrylate, 6-(4,6-dibromo-2-isoprophyl phenoxy)-1-hexyl (meth)acrylate, 6-(4,6-di-bromo-2-sec-butyl phenoxy)-1-hexyl (meth)acrylate, 2,6-dibromo-4-nonylphenyl (meth)acrylate, 2,6-dibromo-4-dodecyl phenyl (meth)acrylate, 2-(1-naphtyloxy)-1-ethyl (meth)acrylate, 2-(2-naphtyloxy)-1-ethyl (meth)acrylate, 6-(1-naphtyloxy)-1-hexyl (meth)acrylate, 6-(2-naphtyloxy)-1-hexyl (meth)acrylate, 8-(1-naphtyloxy)-1-octyl (meth) acrylate, or 8-(2-naphtyloxy)-1-octyl (meth)acrylate, and they can be used alone or in a mixture of two or more kinds thereof.

The compound preferably may be phenoxy ethyl (meth) acrylate, benzyl (meth) acrylate, 2-phenylthio-1-ethyl (meth) acrylate, 2-(1-naphtyloxy)-1-ethyl (meth) acrylate, or 8-(2-naphtyloxy)-1-octyl (meth) acrylate, and more preferably may be phenoxy ethyl (meth) acrylate or benzyl (meth) acrylate.

The content of the aromatic-group containing acrylic monomer is preferably 5 to 35 parts by weight based on 100 parts by weight of the aromatic group-containing acrylic copolymer. If the content is less than 5 parts by weight, the pressure-sensitive adhesive may represent large negative birefringence under residual stress and have to use a large amount of optically anisotropic compound to be described below. If the content exceeds 35 parts by weight, the pressure-sensitive adhesive property balance of the final acrylic pressure-sensitive adhesive may be deteriorated and the pressure-sensitive adhesive strength may be greatly increased, whereby the re-peeling property of the polarizer becomes very poor and the positive birefringence of the pressure-sensitive adhesive under residual stress becomes so large that the light leakage may be aggravated.

The acrylic copolymer (A) preferably has a weight average molecular weight of 800,000 to 2,000,000. If the weight average molecular weight is less than 800,000, the cohesive strength of the pressure-sensitive adhesive is insufficient and thus endurance reliability is poor. If the weight average molecular weight exceeds 2,000,000, the stress releasing effect is not satisfactory.

The acrylic copolymer (A) may further include a copolymer monomer to regulate the Tg of the pressure-sensitive adhesive or to provide other functions. Detailed examples of the copolymer monomer may include a styrene monomer such as styrene or alpha methyl styrene; carbonic acid vinyl ester such as vinyl acetate; a nitrogen-containing monomer such as acrylonitrile, (meth)acryl amide, N-methyl (meth) acryl amide, or N-butoxymethyl (meth)acryl amide, and they can be used alone or in a mixture of two or more kinds thereof.

A copolymerization method of the acrylic copolymer (A) is not specifically limited, and the acrylic copolymer (A) may be prepared by one of solution polymerization, photo-polymerization, bulk polymerization, suspension polymerization, and emulsion polymerization.

Preferably, the acrylic copolymer may be prepared by solution polymerization and a polymerization temperature may be 50 to 140° C., and a polymerization initiator is preferably added in a state where monomers are evenly mixed.

The polymerization initiator may use an azo-based polymerization initiator such as azo-bisisobutyronitrile or azobis-cyclohexanecarbonitrile; or peroxide such as benzoyl peroxide and acetyl peroxide alone or in a mixture thereof.

(B) Optically Anisotropic Compound Having One or More Substituents Containing One of an Alkyl Group, an Alkenyl Group, and an Alkynyl Group in a Meta Position of Mesogen In the present invention, mesogen means a bar-shaped structure comprising one or more aromatic rings connected in one direction.

Generally, optically anisotropic compounds having large birefringence are likely to be crystallized and have low compatibility with high polymer resin. As a result, they, even when used by a small amount, are prone to phase separation and are crystallized, thus being precipitated. To solve these problems, the present invention introduces one or more substituents comprising one of an alkyl group, an alkenyl group, and an alkynyl group in a meta position of mesogen. The substituent introduced in the meta position of a mesogen core increases compatibility with high polymer resin and improves physical properties such as solubility and a melting point when compared with a substituent in a para position.

In the present invention, an optically anisotropic compound may have both meta substituent and para substituent, but preferably has only meta substituent.

The optically anisotropic compound preferably may include a compound expressed by Formula 2:

More specifically, the compound expressed by Formula 2 has one or more substituents ($X_1$—$R_3$ or $X_2$—$R_4$) containing one of an alkyl group, an alkenyl group, and an alkynyl group in a meta position of mesogen, in which l+m+n of a mesogen core is an integer of 1 or over.

In the compound expressed by Formula 2, Y, $G_1$, and $G_2$ may be, independently of one another, a single bond, —O—, —$NR_3$—, —S—, —SO—, —$SO_2$—, —$(CH_2)_p$—, —CH=CH—, —C≡C—, —C(=O)O—, —OC(=O)—, —C(=O)—, —C(=O)$NR_3$—, —$NR_3$C(=O)—, —C(=O)S—, —SC(=O)—, —C(=O)O$(CH_2)_p$—, —OC(=O)$(CH_2)_p$—, —$(CH_2)_p$OC(=O)—, or —$(CH_2)_p$C(=O)O—, respectively, in which p is an integer of 1 to 5.

[Formula 2]

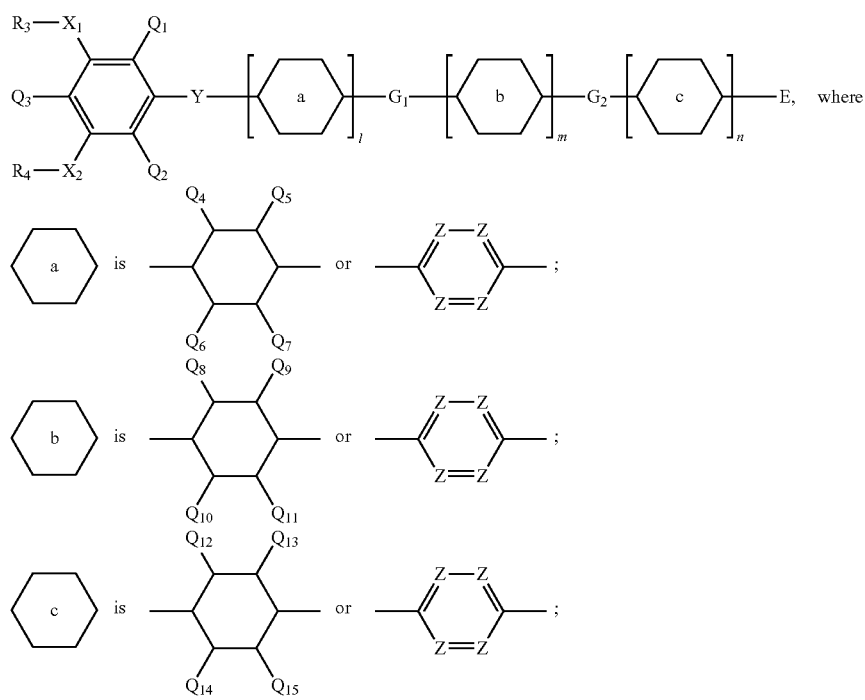

Z is C—W or N;

$Q_1$ through $Q_{15}$, and W are, independently of one another, hydrogen, halogen, cyano, —$R_5$, —$OR_5$, —$NHR_5$, —$NR_5R_5$ or —C(=O)$R_5$, respectively, and l, m, and n are, independently of one another, an integer of 0 to 3, and l+m+n is an integer 1 or over; and Y, $G_1$, $G_2$, $X_1$, and $X_2$ are, independently of one another, a single bond, —O—, —$NR_5$—, —S—, —SO—, —$SO_2$—, $C_1$-$C_6$ alkylene, $C_2$-$C_6$ alkenylene, $C_2$-$C_6$ alkynylene, or —U-T-V—, respectively, wherein -T- indicates carbonyl (—C(=O)—), U and V indicate a single bond, —O—, —$NR_5$—, —S—, —$(CH_2)_p$—, —O$(CH_2)_p$—, —$(CH_2)_p$O—, relatively, and p indicates an integer of 1 to 5, E indicates hydrogen, halogen, cyano, —NCO, —NCS, —$R_5$, or —$OR_5$; and $R_3$, $R_4$, and $R_5$, indicate, independently of one another, hydrogen, $C_1$-$C_{20}$ alkyl unsubstituted or substituted with one or more halogens, $C_2$-$C_{20}$ alkenyl unsubstituted or substituted with one or more halogens, $C_2$-$C_{20}$ alkynyl unsubstituted or substituted with one or more halogens, or —$(R_6O)_qR_7$, in which $R_6$ indicates $C_1$-$C_6$ alkylene, $R_7$ indicates $C_1$-$C_4$ alkyl, and q indicates an integer of 1 to 5 but is not included if both of $R_3$ and $R_4$ are hydrogen at the same time.

$G_1$ and $G_2$ are preferably, independently of one another, a single bond, —CH=CH—, or —C≡C—, and more preferably, a single bond or —C≡C—, respectively.

In the compound expressed by Formula 2, $X_1$ and $X_2$ are preferably, independently of one other, a single bond, —O—, —$NR_3$—, —S—, —SO—, —$SO_2$—, —$(CH_2)_p$—, —C(=O)$NR_3$—, —$NR_3$C(=O)—, —$NR_3$C(=O)$NR_3$—, —C(=O)O—, —OC(=O)—, or —OC(=O)O—, in which p is preferably an integer of 1 or 2.

In the compound expressed by Formula 2, when $R_3$, $R_4$, and $R_5$ are $C_1$-$C_{20}$ alkyl, they may be, but not limited to, linear or branch-type alkyl such as —$CH_3$, —$CH_2CH_3$, —$CH_2CH_2CH_3$, —CH$(CH_3)_2$, —$CH_2CH_2CH_2CH_3$, —CH$(CH_3)CH_2CH_3$, or —$CH_2CH(CH_3)_2$.

When $R_3$, $R_4$, and $R_5$ are $C_2$-$C_{20}$ alkenyl, they may be, but not limited to, linear or branch-type alkenyl such as —CH=$CH_2$, —CH=$CHCH_3$, —$CCH_3$=$CH_2$, —$CH_2$CH=$CH_2$, —CH=$CHCH_2CH_3$, —CH=$C(CH_3)_2$, —$CCH_3$=$CHCH_3$, —$CH_2$CH=$CHCH_3$, —$CH_2CCH_3$=$CH_2$, —$CHCH_3$CH=$CH_2$, or —$CH_2CH_2$CH=$CH_2$.

When $R_3$, $R_4$, and $R_5$ are $C_2$-$C_{20}$ alkynyl, they may be, but not limited to, linear or branch-type alkynyl such as —C≡CH, —CH$_2$C≡CH, —C≡CCH$_3$, —CH$_2$CH$_2$C≡CH, —CHCH$_3$C≡CH, —CH$_2$C≡CCH$_3$, or —C≡CCH$_2$CH$_3$.

In the compound expressed by Formula 2, $R_3$ and $R_4$ are preferably, independently of each other, $C_3$-$C_{12}$ alkyl, $C_3$-$C_{12}$ alkenyl, or $C_3$-$C_{12}$ alkynyl of linear or branch type unsubstituted or substituted with one or more halogens, and more preferably $C_3$-$C_{12}$ alkyl, $C_3$-$C_{12}$ alkenyl, or $C_3$-$C_{12}$ alkynyl of a branch type unsubstituted or substituted with one or more halogens.

In the compound expressed by Formula 2, when $R_3$, $R_4$, and $R_5$ are —($R_6$O)$_q$$R_7$, they are preferably, independently of one another, —(CH$_2$CH$_2$O)$_q$CH$_3$, —(CH$_2$CHCH$_3$O)$_q$CH$_3$, or —(CHCH$_3$CH$_2$O)$_q$CH$_3$, respectively, in which q is preferably an integer of 1 to 5.

The compound expressed by Formula 2 can be more specifically expressed as below, without being limited to the following compound.

The compound expressed by Formula 2 may be prepared by a conventional method used in the art, but may be prepared, but not limited to, by the following method:

[Reaction Formula]

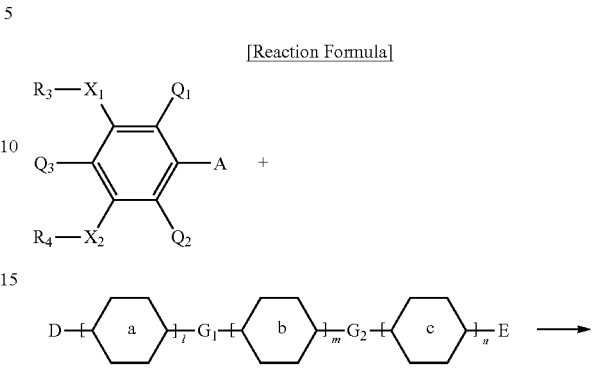

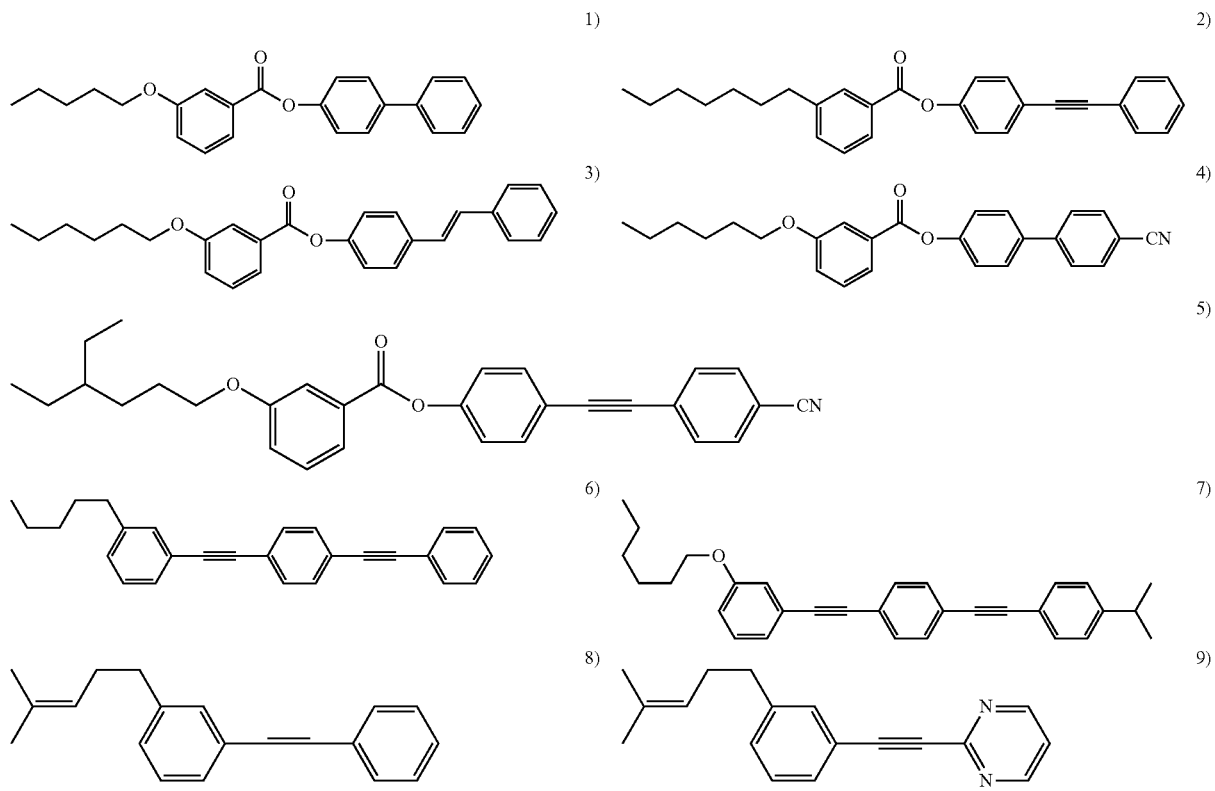

-continued

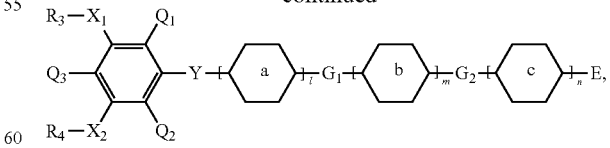

where A may be —YH, —OH, -L, or —B(OH)$_2$, and D may be HY—, HO—, L-, or (HO)$_2$B—. L is a living group and may be, but not limited to, halide, mesylate, tosylate, or triplate. Other symbols are the same as those defined in Formula 1.

A solvent in the reaction may be hexane, ether, methylenchloride, tetrahydrofuran (THF), dioxane, butanone, The acrylic pressure-sensitive adhesive composition according to the present invention may include the compound expressed by Formula 2 alone or in a mixture of two or more kinds thereof, and the content of the compound may be preferably 5 to 30 parts by weight based on 100 parts by weight of the acrylic copolymer (A). If the content is less than 5 parts by weight, the optical compensation effect of the pressure-sensitive adhesive is degraded. If the content exceeds 30 parts by weight, compatibility with the pressure-sensitive adhesive is deteriorated due to the excessive use of the compound, whereby the positive birefringence of the pressure-sensitive adhesive is increased relative to the negative birefringence generated by the shrinkage of the polarizer and thus the light leakage phenomenon is likely to occur.

methanol, ethyl acetate, ethanol, water, or a mixture thereof; benzene-based solvent such as benzene or toluene; and the like. In addition, reaction temperature may be 0 to 200° C. and reaction time may be 1 to 30 hours.

According to the type of reaction, a catalyst used in the art such as Pd, Cu, or Ni may be used.

A detailed preparation method of the compound expressed by Formula 2 is as shown in Reaction Formulas 1 to 5.

[Reaction Formula 1: when Y is —C≡C—]

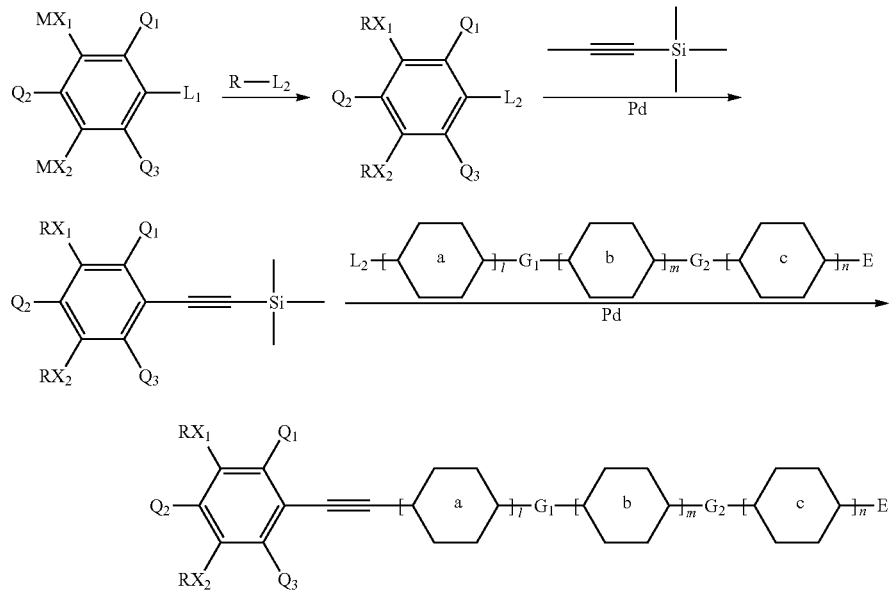

A substituent is added to a meta position by using a material such as base and alkyl halide, and then Pd coupling reaction is carried out to make a tolane structure.

[Reaction Formula 2: when Y is —O—, —NR$_3$—, —S—]

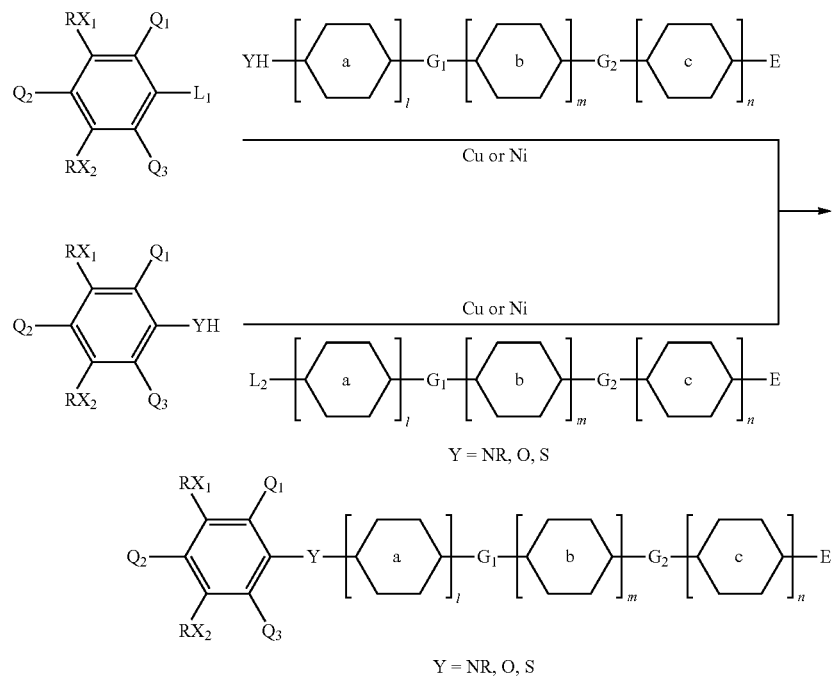

[Reaction Formula 3: when Y is single bond, —(CH$_2$)$_q$—, —CH=CH—, or —C(=O)—]
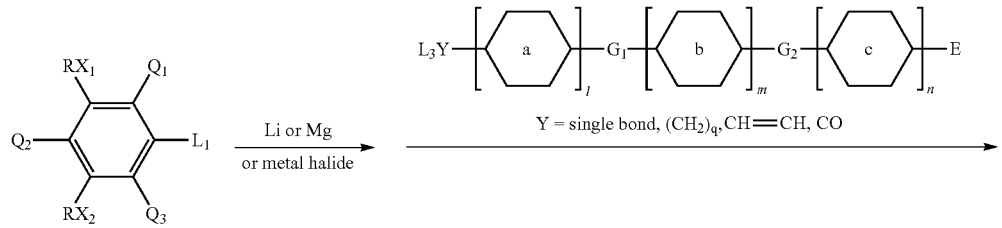
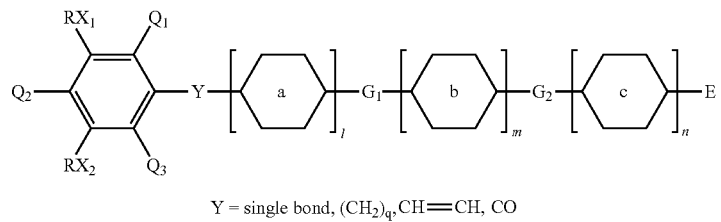
Y = single bond, (CH$_2$)$_q$, CH=CH, CO
From nucleophilic substitution reaction, Y can form a compound of a single bond, (CH$_2$)$_q$, CH=CH, or C$_O$.
[Reaction Formula 4: when Y is —C(=O)O—]
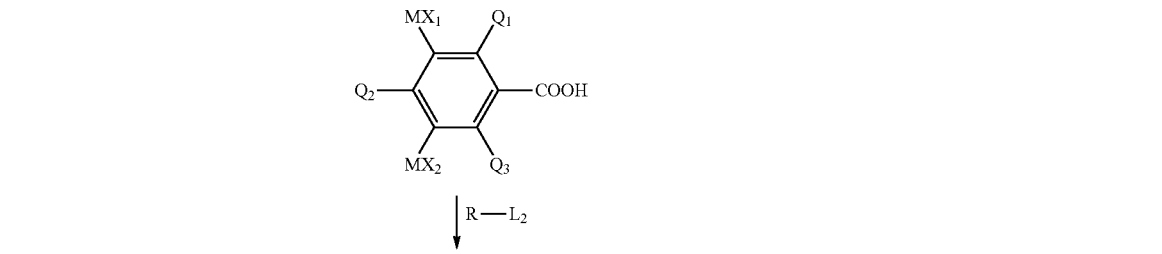
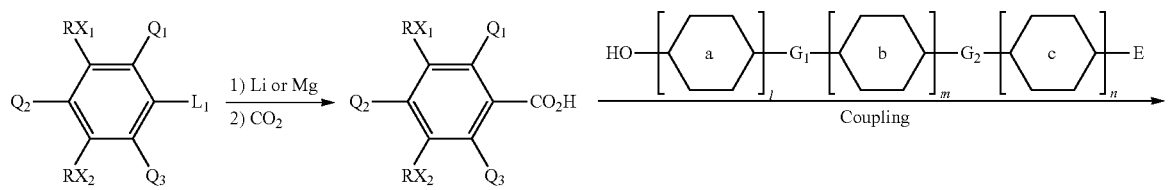
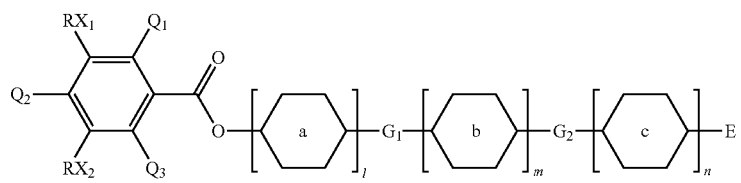

[Reaction Formula 5: when Y is ——OC(=O)——]

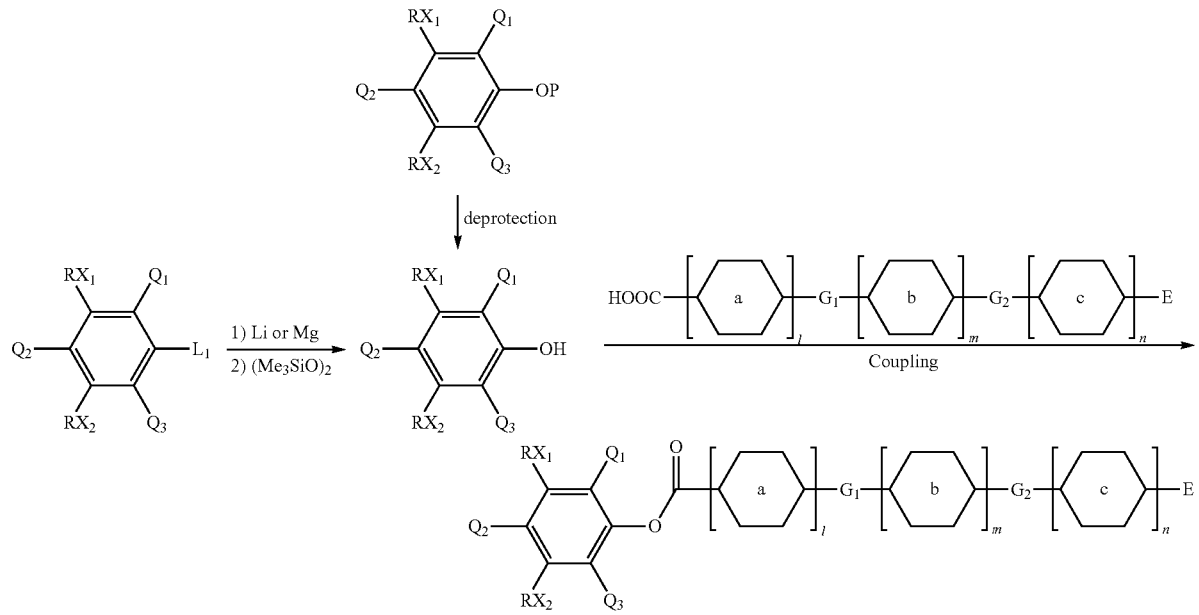

A CO$_2$ gas is bubbled to form a CO$_2$H group and an OH group can be introduced by using (Me$_3$SiO)$_2$. An ester compound may be made by using SOCl$_2$, COCl$_2$, MsCl, TsCl, EDC[1-Ethyl-3-(3-dimethyl aminopropyl) carbo diimide hydrochloride], or DCC(dicyclohexylcarbodiimide), or an esterification reaction may be performed by using Dean-Stark.

In Reaction Formulas 1 to 5, M indicates metal capable of generating anions, such as Li, Na, Mg, K, Ca, or Cs, and may use BuLi, NaH, NaOH, NaHCO$_3$, Na$_2$CO$_3$, Mg, K$_2$CO$_3$, KOH, CaH, Cs$_2$CO$_3$, or organic salts such as amine. P means a protection group.

The foregoing reaction Formulas are merely exemplary methods, and the compound expressed by Formula 2 can be prepared by not only Reaction Formulas 1 to but also a preparation method of a similar flow to Reaction Formulas 1 to 5.

(C) Low-Molecular Weight Material Having Weight Average Molecular Weight of 1,000 to 30,000 or Plasticizer Preferably, the present invention may further include a low-molecular weight material having a weight average molecular weight of 1,000 to 30,000 or plasticizer (C).

The low-molecular weight material having a weight average molecular weight of 1,000 to 30,000 or plasticizer according to the present invention reduces the modulus of the pressure-sensitive adhesive. Thus, the creep amount with respect to external stress is increased and deformation easily occurs, thereby releasing local stress generated by the shrinkage or expansion of the polarizer. When the weight average molecular weight is less than 1,000, it cannot be uniformly distributed over the pressure-sensitive adhesive due to very low molecular weight. If the weight average molecular weight exceeds 30,000, the modulus of the pressure-sensitive adhesive cannot be reduced, leading to degradation in the stress releasing effect.

A low molecular weight material that can be used in the present invention is not specifically limited if it is compatible with an acrylic copolymer, and may be a (meth) acrylic ester monomer having an alkyl group which is a main component of an acrylic copolymer, and preferably includes a crosslinking functional group-containing monomer by a small amount or does not include the same at all. The detailed type of the (meth) acrylic ester monomer having an alkyl group has already been described above, and it is desirable to use a butyl acrylate homo polymer.

A plasticizer that can be used in the present invention is not specifically limited if it is compatible with an acrylic copolymer, and may be a phthalic acid-based plasticizer such as diisononylphthalate, di-(2-ethylhexyl)phthalate, diisodesylphthalate, or butylbenzylphthalate; a fatty acid ester-based plasticizer such as di-(2-ethylhexyl)adipate, di-n-decyladipate, di-(2-ethylhexyl)azelate, dibutylsebacate, or di-(2-ethylhexyl)sebacate; a phosphoric ester-based plasticizer such as tributylphosphate, tri(2-ethylhexyl)phosphate, or 2-ethylhexylphenyl phosphate; an epoxy-based plasticizer such as epoxy soybean oil; a trimellitate-based plasticizer; a pyromellitate-based plasticizer; a benzoic acid-based plasticizer, a polyester-based plasticizer; or a sulfonic acid ester-based plasticizer, and they can be used alone or in a mixture of two or more kinds thereof.

It is preferable that the low-molecular weight material having a weight average molecular weight of 1,000 to 30,000 or plasticizer have 5 to 30 parts by weight based on 100 parts by weight of the acrylic copolymer. If the content is less than 5 parts by weight, the stress releasing effect is not revealed. If the content exceeds 30 parts by weight, endurance reliability may be deteriorated.

Multifunctional Crosslinking Agent

The acrylic pressure-sensitive adhesive composition according to the present invention may include 0.01 to 5 parts by weight of a multifunctional crosslinking agent based on 100 parts by weight of an acrylic copolymer.

The multifunctional crosslinking agent may use one or more kinds selected from a group consisting of an isocyanate compound, an epoxy compound, an aziridine compound, and a metal chelate compound, and more preferably uses an isocyanate compound.

The isocyanate compound may use one or more kinds selected from a group consisting of toluene diisocyanate, xylenediisocyanate, diphenylmethanediisocyanate, hexamethylene diisocyanate, isoform diisocyanate, tetramethylxylene diisocyanate, naphthalene diisocyanate, and their reactants with polyol like trimethylolpropane.

The epoxy compound may use one or more kinds selected from a group consisting of ethyleneglycol diglycidylether, triglycidylether, trimethylolpropane triglycidylether, N,N,N', N'-tetraglycidylethylenediamine, and glycerine diglycidylether.

The aziridine compound may use one or more kinds selected from a group consisting of N,N'-toluene-2,4-bis(1-aziridinecarboxide), N,N'-diphenylmethane-4,4'-bis(1-aziridinecarboxide), triethylenemelamine, bisisoprothaloyl-1-(2-methylaziridine), and tri-1-aziridinylphosphineoxide.

The metal chelate compound may use one or more kinds selected from a group consisting of compounds prepared by coordinating multivalent metal such as Al, Fe, Zn, Sn, Ti, Sb, Mg, or V with acethylacetone or ethyl acetoacetate.

The content of the multifunctional crosslinking agent is preferably 0.01 to 5 parts by weight based on 100 parts by weight of the acrylic copolymer (A). If the content is less than 0.01 parts by weight, endurance is degraded due to the low crosslinking degree of the pressure-sensitive adhesive. If the content exceeds 5 parts by weight, endurance may also be degraded due to the high crosslinking degree of the pressure-sensitive adhesive.

In a mixing process for forming an acrylic pressure-sensitive adhesive composition and a pressure-sensitive adhesive layer, a crosslinking reaction by functional groups of the multifunctional crosslinking agent described above should not occur for even coating. After the coating followed by drying and aging, a crosslinking structure is formed, thereby obtaining a pressure-sensitive adhesive layer having strong elasticity and cohesion.

Additive

The acrylic pressure-sensitive adhesive composition according to the present invention may further include a silane coupling agent for improving adhesion stability and thus more improving heat resistance/moisture resistance when it is adhered to a glass substrate.

The silane coupling agent serves to be of help to improve adhesion reliability when it is left for a long time under high temperature and high humidity, and the content thereof may be 0.005 to 5 parts by weight based on 100 parts by weight of the acrylic copolymer (A). If the content is less than 0.005 parts by weight, the adhesion stability is not improved. If the content exceeds 5 parts by weight, endurance reliability is degraded.

The silane coupling agent compound may use γ-glycydoxypropyl trimethoxysilane, γ-glycydoxypropyl methyldiethoxysilane, γ-glycydoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane, and they may be used alone or in a mixture thereof.

The acrylic pressure-sensitive adhesive composition according to the present invention may have added thereto tackifier resin for regulating pressure-sensitive adhesion performance and the content of the tackifier resin may be in a range of 1 to 100 parts by weight based on 100 parts by weight of the acrylic copolymer (A).

If the content of the tackifier resin exceeds the above limited amount, the compatibility or cohesive strength of the pressure-sensitive adhesive may be reduced.

The tackifier resin may be (hydrogenated) hydrocarbon resin, (hydrogenated) rosin resin, (hydrogenated) rosin ester resin, (hydrogenated) terpene resin, (hydrogenated) terpene phenol resin, polymerized rosin resin, or polymerized rosin ester resin, and they may be used alone or in a mixture of two or more kinds thereof.

In addition, the present invention may additionally use epoxy resin, and a curing agent in a mixture for particular purposes, and may properly have added thereto a ultraviolet (UV) stabilizer, antioxidants, a coloring agent, a reinforcing agent, a filler, an antifoaming agent, a surfactant, and an antistatic agent for general purposes.

The present invention also relates to a polarizer comprising a polarization film; and a pressure-sensitive adhesive layer formed on one side or both sides of the polarization film and containing the pressure-sensitive adhesive composition according to the present invention.

The polarizer according to the present invention includes the pressure-sensitive adhesive layer made of the pressure-sensitive adhesive composition on one side or both sides of the polarization film, and the polarization film or a polarization device of the polarizer is not specifically limited.

For example, the polarization film may be prepared by adding a polarization component such as iodine or dichroic dye onto a polyvinyl alcohol-based resin film and elongating it. Also, there is no limitation in the thickness of the polarization film and so the polarization film may be made in conventional thickness. In addition, the polyvinyl alcohol-based resin may be polyvinyl alcohol, polyvinyl formal, polyvinyl acetal and polyvinyl ethylene, or a saponified vinyl acetate copolymer.

On both sides of the polarization film, multilayer films may be formed, which are made by laminating protective films such as cellulose-based film like triacetyl cellulose, etc; polyester-based film like polycarbonate film, polyethylene terephthalate, etc; poly ether sulphone-based film; poly olefin-based film having the structure of polyethylene, polypropylene, polyolefin film having cyclo-based structure or norbornene-based structure, or an ethylene propylene copolymer. The thickness of such protective films is not limited specifically, and conventional thickness may be accepted.

In the present invention, a method for forming the pressure-sensitive adhesive layer on the polarization film is not specifically limited. For example, the method may include coating the pressure-sensitive adhesive directly on the surface of the polarization film with Bar Coater and then drying it, or coating the pressure-sensitive adhesive on the surface of the dissecting substrate followed by drying and transferring the pressure-sensitive adhesive layer onto the surface of the polarization film, followed by aging.

The polarizer according to the present invention may have laminated thereon one or more layers providing supplementary functions, such as a protective layer, a reflecting layer, an anti-glare film, a phase retardation film, a compensation film for wide view angle, or a brightness enhancing film.

The present invention also relates to a liquid crystal display (LCD) device comprising a liquid crystal panel in which the polarizer is attached onto one side or both sides of a liquid crystal cell.

The polarizer according to the present invention can be applied to all general LCD devices, and the kind of liquid crystal panel is not specifically limited. Preferably, the present invention may construct an LCD device comprising a liquid crystal panel in which the polarizer is attached onto one side or both sides of a liquid crystal cell.

EMBODIMENT

While the present invention will now be described in more detail by using embodiment and comparative examples, the embodiment is used to help understanding of the present invention, without limiting the scope of the present invention.

(A) Acrylic Copolymer

Preparation Example 1

To a 1 L reactor equipped with a cooling system for reflux of nitrogen gas and easy regulation of temperature, a monomer mixture composed of 98 parts by weight of n-butylacrylate (n-BA) and 2 parts by weight of 2-hydroxyethyl (meth) acrylate (2-HEMA) was added, and then 120 parts by weight of ethylacetate (EAc) was added thereto as a solvent. To remove oxygen, nitrogen gas was purged for 60 minutes, and the temperature was kept at 60° C., and then 0.03 parts by weight of azobisisobutyronitrile (AIBN) was added thereto as a reaction initiator and reacted for 8 hours. After reaction, the mixture was diluted with ethylacetate (EAc), thereby preparing an acrylic copolymer having 20 weight percent of solid and having a weight average molecular weight of 1,500,000.

Preparation Examples 2 and 3

By excluding or adding some of components from or to Preparation Example 1 as shown in Table 1, a high molecular weight acrylic copolymer was prepared and results thereof are shown in Table 1.

TABLE 1

|  | Symbol | Component | Preparation Example 1 | Preparation Example 2 | Preparation Example 3 |
|---|---|---|---|---|---|
| Copolymer Composition | i) | n-BA | 98 | 95 | 83 |
|  | i) | MA | — | — | 15 |
|  | ii) | 2-HEMA | 2 | — | 2 |
|  | ii) | AA | — | 5 | — |
| Initiator |  | AIBN | 0.03 | 0.03 | 0.03 |
| Solvent |  | EAC | 120 | 110 | 150 |
| Weight Average Molecular Weight (10 thousand) |  |  | 150 | 160 | 120 | n-BA: n-butylacrylate
MA: methylacrylate
2-HEMA: 2-hydroxyethyl(meth)acrylate
AA: acrylic acid
AIBN: azobisisobutyronitrile
EAc: ethylacetate (unit: part by weight)

Preparation Example 4

To a 1 L reactor equipped with a cooling system for reflux of nitrogen gas and easy regulation of temperature, a monomer mixture composed of 78 parts by weight of n-butylacrylate (n-BA), 20 parts by weight of benzylacrylate, and 2 parts by weight of 2-hydroxy ethyl (meth) acrylate (2-HEMA) was added according to composition as shown in Table 2, and then 120 parts by weight of ethylacetate (EAc) was added thereto as a solvent. To remove oxygen, nitrogen gas was purged for 60 minutes, and the temperature was kept at 60° C., and then 0.03 parts by weight of azobisisobutyronitrile (AIBN) was added thereto as a reaction initiator and reacted for 8 hours. After reaction, the mixture was diluted with ethylacetate (EAc), thereby preparing an acrylic copolymer containing an aromatic group having 20 weight percent of solid and having a weight average molecular weight of 1,500,000.

Preparation Examples 5 to 9

By excluding or adding some of components from or to Preparation Example 4 as shown in Table 2, an acrylic copolymer containing a high molecular weight aromatic group was prepared and results thereof are shown in Table 2.

TABLE 2

|  |  |  | Preparation Examples | | | | | |
|---|---|---|---|---|---|---|---|---|
|  | Symbol | Component | 4 | 5 | 6 | 7 | 8 | 9 |
| Copolymer Composition | i) | n-BA | 78 | 90 | 53 | 96 | 58 | 98 |
|  | i) | MA |  |  | 15 |  |  |  |
|  | ii) | BzA | 20 | 5 |  | 2 |  |  |
|  | ii) | PHEA |  |  | 35 |  | 40 |  |
|  | iii) | 2-HEMA | 2 |  | 2 | 2 | 2 | 2 |
|  | iii) | AA |  | 5 |  |  |  |  |
| Initiator |  | AIBN | 0.03 | 0.03 | 0.03 | 0.03 | 0.03 | 0.03 |
| Solvent |  | EAC | 120 | 110 | 150 | 120 | 120 | 120 |
| Weight Average Molecular Weight (10 thousand) |  |  | 150 | 160 | 120 | 150 | 150 | 150 | n-BA: n-butylacrylate,
MA: methylacrylate
BzA: benzylacrylate
PHEA: phenoxyethylacrylate
2-HEMA: 2-hydroxyethyl(meth)acrylate
AA: acrylic acid
AIBN: azobisisobutyronitrile
EAc: ethylacetate (unit: part by weight)

(B) Optically Anisotropic Compound

Preparation Example 10

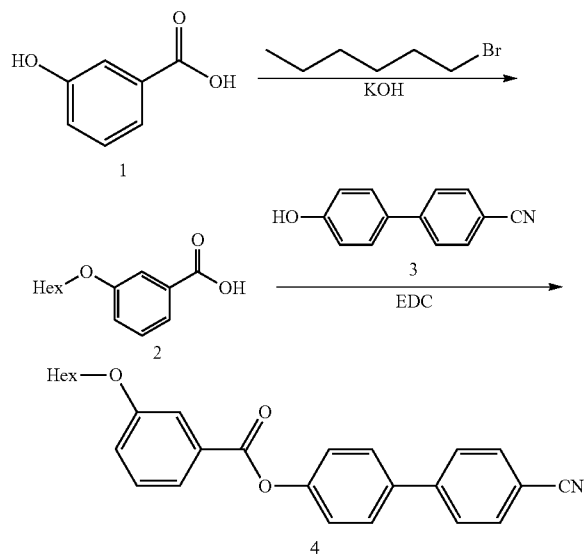

1.0 equivalent of Compound 1 was dissolved in a mixture solvent of ethanol:water=7:3, and then 1.0 equivalent of bromohexane and 2.2 equivalent of KOH were added thereto and stirred at 90° C. for 10 hours. Ethanol was completely removed by reduced pressure distillation and then water was additionally added to the mixture. 10% HCl(aq) was slowly added to the mixture to regulate pH between 1-3, thereby obtaining Compound 2 at a yield of 90% and over. 1.0 equivalent of Compound 2 and 1.0 equivalent of Compound 3 were dissolved in $CH_2C_{l2}$. 1.2 equivalent of EDC and 0.1 equivalent of DMAP were added to the mixture and stirred for about 10 hours at room temperature. After completion of reaction, the mixture was worked up with $CH_2C_{l2}$ and refined with silica gel, and thus final Compound 4 was prepared at a yield of 88% and over. This was checked by 1HNMR. 1HNMR (400 MHz, $CDCl_3$): δ 0.93 (t, 3H), 1.29~1.45 (m, 4H), 1.46~1.57 (m, 2H), 1.78~1.89 (m, 2H), 4.05 (t, 2H), 7.20 (dd, 1H), 7.35 (d, 2H), 7.43 (t, 1H), 7.67 (d, 2H), 7.69~7.80 (m, 5H), 7.83 (d, 1H).

Preparation Example 11

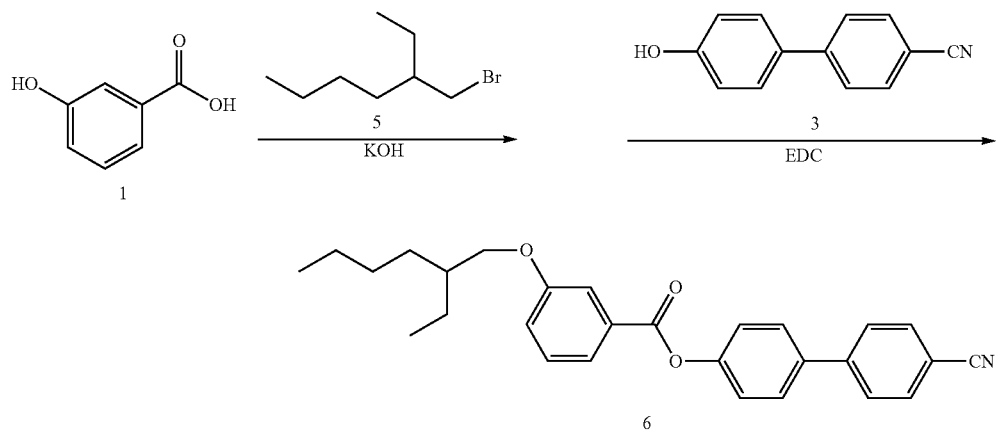

1.0 equivalent of Compound 1 was dissolved in a mixture solvent of ethanol:water=7:3, and then 1.0 equivalent of 2-ethylhexyl bromide 5 and 2.2 equivalent of KOH were added thereto and stirred at 90° C. for 10 hours. Ethanol was completely removed by reduced pressure distillation and then water was additionally added to the mixture. 10% HCl(aq) was slowly added to the mixture to regulate pH between 1-3, thereby obtaining alkoxybenzoic acid at a yield of 90% and over. 1.0 equivalent of the benzoic acid compound and 1.0 equivalent of Compound 3 were dissolved in $CH_2C_{l2}$. 1.2 equivalent of EDC and 0.1 equivalent of DMAP were added to the mixture and stirred for about 10 hours at room temperature. After completion of reaction, the mixture was worked up with $CH_2C_{l2}$ and refined with silica gel, and thus final Compound 6 was prepared at a yield of 85% and over. This was checked by 1HNMR. 1HNMR (400 MHz, $CDCl_3$): δ 0.90-0.97 (m, 6H), 1.29~1.38 (m, 4H), 1.38~1.61 (m, 4H), 1.69~1.81 (m, 1H), 3.94 (dd, 2H), 7.21 (dd, 1H), 7.34 (d, 2H), 7.42 (t, 1H), 7.66 (d, 2H), 7.68~7.78 (m, 5H), 7.80 (d, 1H).

Preparation Example 12

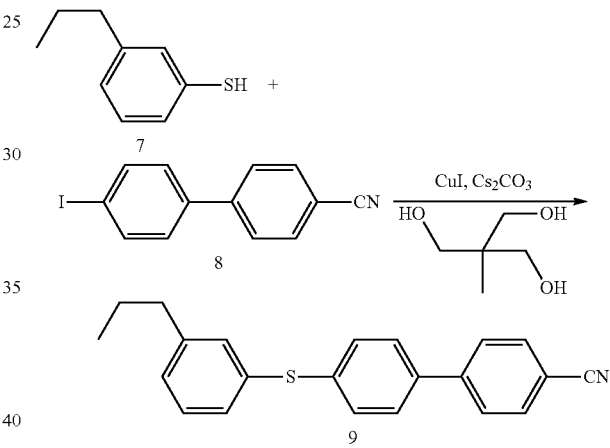

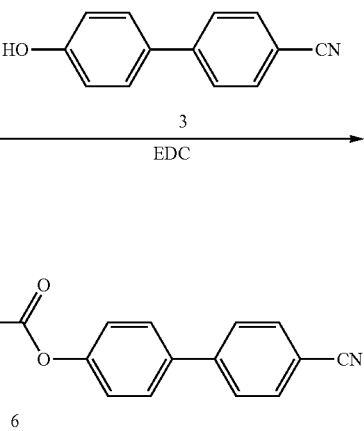

1.0 equivalent of Compound 7 and 1.0 equivalent of Compound 8 were dissolved in a mixture solvent of dioxane:DMF=9:1, and then 2.0 equivalent of $Cs_2CO_3$, 0.1 equivalent of CuI, and 0.1 equivalent of 1,1,1-tris(hydroxymethyl)ethane were added thereto and stirred at 110° C. for 20 hours. After completion of reaction, the mixture was worked up with ether and water, and refined with silica gel, and thus Compound 9 was prepared at a yield of about 90%. This was checked by 1HNMR. 1HNMR (400 MHz, CDCl$_3$): δ 0.93 (t, 3H), 1.48~1.63 (m, 2H), 2.30 (t, 3H), 7.02~7.53 (m, 6H), 7.65 (d, 2H), 7.69~7.74 (m, 4H).

Preparation Example 13

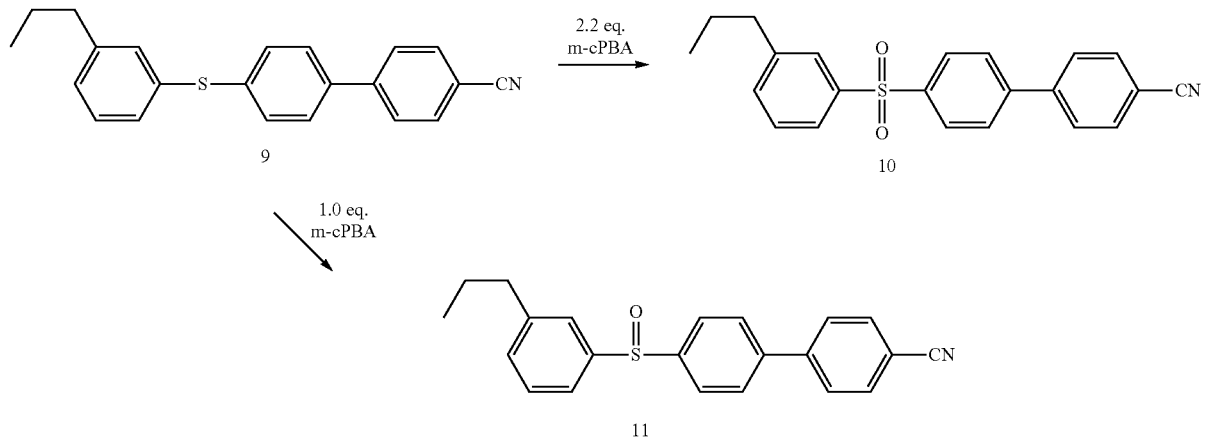

1.0 equivalent of Compound 9 was dissolved in a CH$_2$Cl$_2$ solvent, and then 2.2 equivalent of m-chloroperbenzoic acid (m-CPBA) was slowly added thereto at temperature of 0° C. This mixture was stirred for 30 minutes at room temperature and then worked up, and was refined with silica gen, thereby preparing Compound 10 at a yield of 80%. By using 1.0 equivalent of m-CPBA, instead of 2.2 equivalent of m-CPBA, sulfoxide Compound 11 was prepared. This was checked by 1HNMR. 1HNMR (400 MHz, CDCl$_3$): δ 0.93 (t, 3H), 1.48~1.63 (m, 2H), 2.30 (t, 3H), 7.18~7.22 (m, 2H), 7.63 (d, 2H), 7.65~7.70 (m, 4H), 7.99~8.05 (m, 4H).

Preparation Example 14

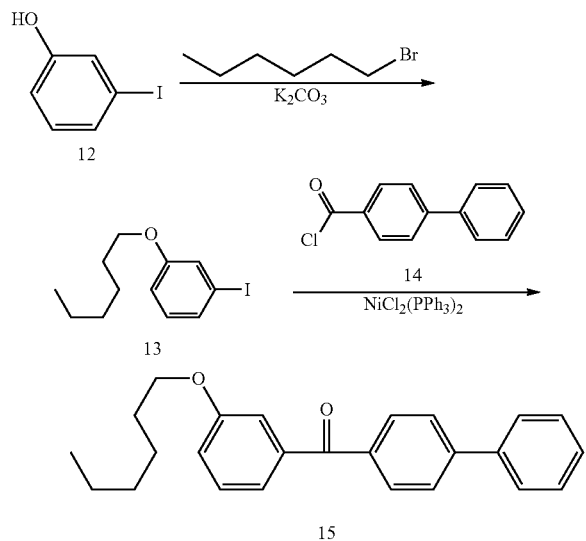

1.0 equivalent of Compound 12 was dissolved in butanone, and then 1.2 equivalent of hexylbromide and 1.2 equivalent of K$_2$CO$_3$ were added thereto and stirred at 80° C. for about 5 hours. After completion of reaction, the mixture was worked up with ether and refined with silica gel, and thus Compound 13 was prepared at a yield of 90% and over. Compound 14 can be prepared by using SOCl$_2$ and TEA in an acid compound (Compound 19 to be described below) in a general manner. 1.0 equivalent of Compound 13 and 1.0 equivalent of Compound 14 were dissolved in a benzene solvent from which moisture was removed, and then NiCl$_2$(PPh$_3$)$_2$ was added to the mixture as a catalyst and stirred for about 2 hours at room temperature. This mixture was worked up by using water and ether, and thus final Compound 15 was obtained at a yield of about 70% by using silica gel column chromatography. This was checked by 1HNMR. 1HNMR (400 MHz, CDCl3): δ 0.98 (t, 3H), 1.30~1.45 (m, 4H), 1.45~1.59 (m, 2H), 1.80~1.89 (m, 2H), 4.05 (t, 2H), 7.21~7.60 (m, 9H), 7.87 (s, 1H), 7.92 (m, 3H).

Preparation Example 15

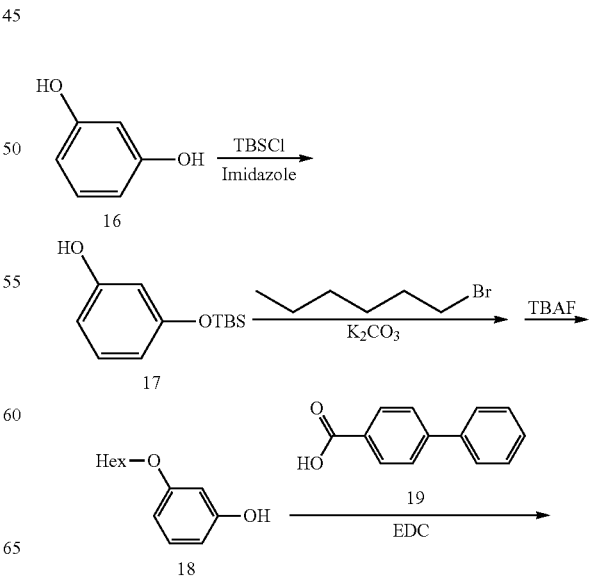

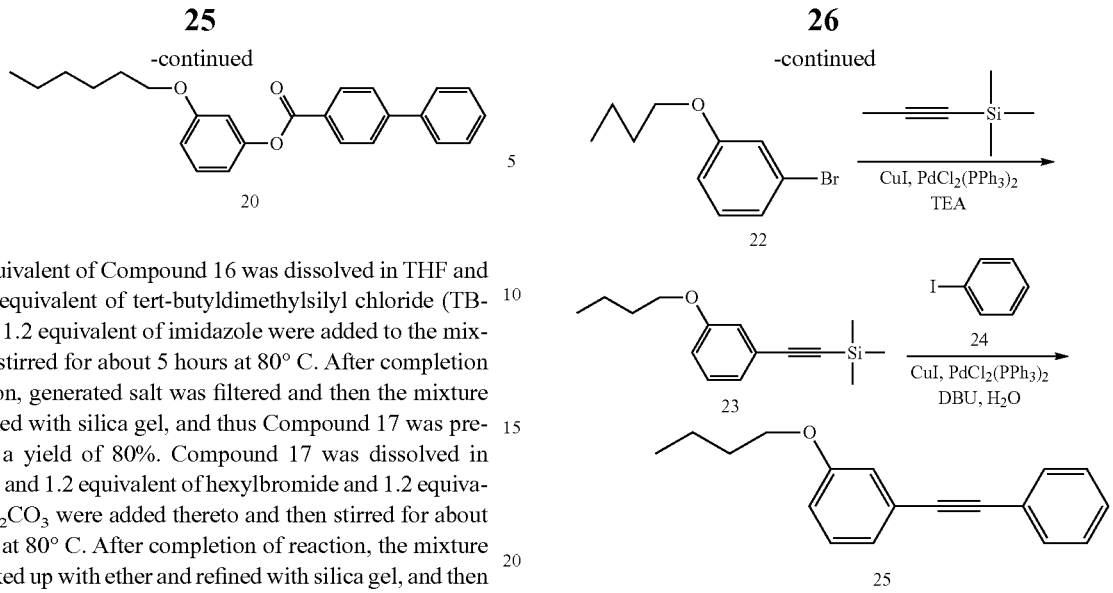

1.0 equivalent of Compound 16 was dissolved in THF and then 1.0 equivalent of tert-butyldimethylsilyl chloride (TB-SCl) and 1.2 equivalent of imidazole were added to the mixture and stirred for about 5 hours at 80° C. After completion of reaction, generated salt was filtered and then the mixture was refined with silica gel, and thus Compound 17 was prepared at a yield of 80%. Compound 17 was dissolved in butanone and 1.2 equivalent of hexylbromide and 1.2 equivalent of $K_2CO_3$ were added thereto and then stirred for about 10 hours at 80° C. After completion of reaction, the mixture was worked up with ether and refined with silica gel, and then dissolved in THF. 1.1 equivalent of TBAF was added to the mixture to carry out deprotection. The mixture was stirred for about 1 hour at room temperature, worked up with ether, and then refined with silica gel, thereby preparing Compound 18. 1.0 equivalent of Compound 18 and 1.0 equivalent of Compound 19 were dissolved in $CH_2Cl_2$, and then 1.2 equivalent of EDC and 0.1 equivalent of DMAP were added thereto and stirred for about 10 hours at room temperature. After completion of reaction, the mixture was worked up with $CH_2Cl_2$ and refined with silica gel, and thus preparing Compound 20 was at a yield of 85%. This was checked by 1HNMR. 1HNMR (400 MHz, $CDCl_3$): δ 0.97 (t, 3H), 1.29~1.44 (m, 4H), 1.45~1.57 (m, 2H), 1.78~1.89 (m, 2H), 4.03 (t, 2H), 7.22~7.56 (m, 9H), 7.60 (d, 1H), 7.88 (d, 1H), 8.11 (d, 2H).

Preparation Example 16

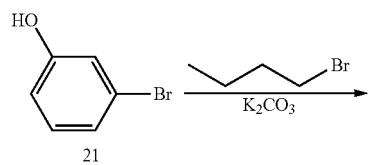

1.0 equivalent of m-bromophenol (Compound 21) was dissolved in butanone, and then 1.2 equivalent of bromobutane and 1.2 equivalent of $K_2CO_3$ were added thereto and stirred for about 5 hours at 80° C. After completion of reaction, the mixture was worked up by using ether and water, and refined with silica gel, and thus Compound 22 was obtained at a yield of about 95%. 1.0 equivalent of Compound 22, 1.0 equivalent of trimethylsilylacetylene, 0.1 equivalent of CuI, 0.03 equivalent of $PdCl_2(PPh_3)_2$, and 4.0 equivalent of triethylamine were dissolved in benzene and stirred for about 10 hours at 60° C. After completion of reaction, the mixture was worked up with ether and water, and refined with silica gel, and thus Compound 23 was prepared at a yield of about 90%. 1.0 equivalent of Compound 23, 1.0 equivalent of Compound 24, 0.1 equivalent of CuI, 0.03 equivalent of $PdCl_2(PPh_3)_2$, 6.0 equivalent of DBU, and 1.0 equivalent of $H_2O$ were dissolved in benzene and stirred for about 10 hours at 60° C. After completion of reaction, the mixture was worked up with ether and water, and refined with silica gel, and thus final Compound 25 was obtained at a yield of about 85%. This was checked by 1HNMR. 1HNMR (400 MHz, $CDCl_3$): δ 1.06 (t, 3H), 1.73~1.92 (m, 4H), 4.07 (t, 2H), 7.17 (d, 1H), 7.22 (d, 1H), 7.25~7.30 (m, 3H), 7.47 (m, 3H), 7.68 (s, 1H).

Preparation Example 17

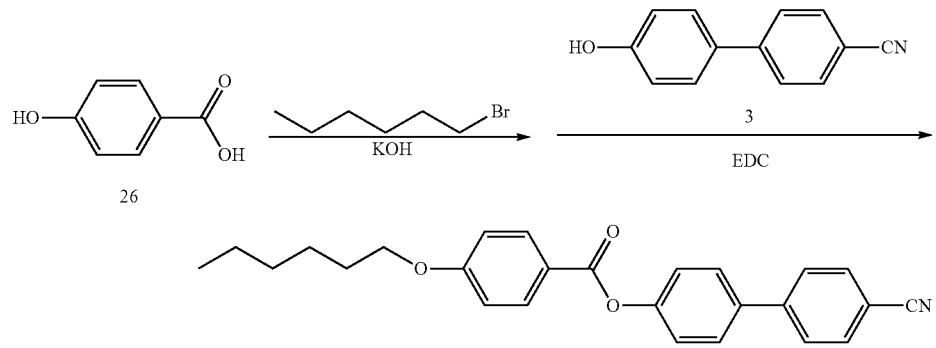

Compound 27 having a substituent in a para position was synthesized in the same preparation method used in Preparation Example 10, in which Compound 26 was used instead of Compound 1.

Example 1

Mixing Process 100 parts by weight (solid) of a high molecular weight acrylic copolymer obtained in Preparation Example 1 and 5 parts by weight of an optically anisotropic compound obtained in Preparation Example 10 were homogeneously mixed, and then 0.1 part by weight of toluene diisocyanate adduct of trimethylolpropane and 0.1 part by weight of γ-glycydoxypropyl trimethoxysilane were added thereto as a crosslinking agent. This mixture was diluted in a proper concentration considering coating properties and then homogeneously mixed. The resulting product was coated on a releasing sheet and dried, thereby obtaining a 25 μm homogeneous pressure-sensitive adhesive layer.

(Laminating Process)

The prepared pressure-sensitive adhesive layer was subjected to pressure-sensitive adhesion processing to an iodine polarizer having a thickness of 185 μm, after which aging was carried out for 7 days. The obtained polarizer was cut into proper sizes and evaluated.

Examples 2 to 8

Based on mixture of Example 1 at a mixture ratio of Tables 3 and 4, the mixing process and the laminating process were carried out in the same manner as Example 1 by using an acrylic copolymer prepared by Preparation Examples 1 to 3, an optically anisotropic compound prepared by Preparation Examples 10 to 17, and a multifunctional crosslinking agent.

Examples 9 to 15

Based on mixture of Example 9 at a mixture ratio of Tables 5 and 6, the mixing process and the laminating process were carried out in the same manner as Example 1, an acrylic copolymer containing an aromatic group prepared by Preparation Examples 4 to 9, and an optically anisotropic compound and a crosslinking agent prepared by Preparation Examples 10 to 17.

Comparative Examples 1 to 4

By mixing or partially mixing some of components based on mixture of Example 1 at a mixture ratio of Table 4, the mixing process and the laminating process were performed on an acrylic copolymer in the same manner as Example 1.

Comparative Examples 5 to 10

By mixing or partially mixing some of components based on mixture of Example 1 at a mixture ratio of Table 6, the mixing process and the laminating process were performed on an acrylic copolymer in the same manner as Example 1.

Test Example

To evaluate the characteristics of a pressure-sensitive adhesive composition prepared in Examples 1 to 15 and Comparative Examples 1 to 10, the following test items were investigated and results thereof are shown in Tables 3 to 6.

1. Compatibility

A pressure-sensitive adhesive prepared in Examples and Comparative Examples was coated on a releasing sheet and dried, and then it is checked if the pressure-sensitive adhesive becomes hazy due to poor compatibility. The pressure-sensitive adhesive was attached onto a polarizer and was kept at room temperature, low temperature (−20° C.), and high temperature (50° C.) for 6 months, in order to check if crystallization of an optically anisotropic compound occurred.

2. Endurance Reliability

The polarizer (90 mm×170 mm) coated with the pressure-sensitive adhesive prepared in Examples and Comparative Examples was attached onto both sides of a glass substrate (110 mm×190 mm×0.7 mm) with each optical absorbing axis crossed. The glass substrate was subjected to a clean room work at the applied pressure of about 5 kg/cm² so that bubbles or impurities might not be generated. In order to evaluate moisture-heat resistance of the specimens, they were left at a temperature of 60° C. and a relative humidity of 90% for 1000 hours and then observed about formation of bubbles or releases. The specimens were left at room temperature for 24 hours immediately before evaluation of their states. The evaluation standard for endurance reliability was as follows:

○: No bubble or release phenomenon was observed.

Δ: A few bubbles or release phenomenon occurred.

×: A large quantity of bubbles or release phenomenon occurred.

3. Uniformity of Light Transmission (Light Leakage)

To investigate uniformity of light transmission with the same specimen as the aforementioned specimen, the glass substrate was observed about whether light was leaked in a dark room using a backlight. To test uniformity of light transmission, a coated polarizer (200 mm×200 mm) was attached onto both sides of a glass plate (210 mm×210 mm×0.7 mm) crossed at 90°. The uniformity of light transmission was evaluated with the following standard:

⊙: Non-uniformity phenomenon of light transmission was difficult to determine by the naked eye.

○: Some few non-uniformity phenomenon of light transmission was present.

Δ: More or less non-uniformity phenomenon of light transmission was present.

×: A large quantity of non-uniformity phenomenon of light transmission was present.

TABLE 3

| | | Examples | | | | | |
|---|---|---|---|---|---|---|---|
| | | 1 | 2 | 3 | 4 | 5 | 6 |
| (A) Acrylic copolymer | Preparation Example 1 | 100 | 100 | | | | |
| | Preparation Example 2 | | | 100 | 100 | | |
| | Preparation Example 3 | | | | | 100 | 100 |
| (B) Optically anisotropic compound | Preparation Example 10 | 5 | | | | | |
| | Preparation Example 11 | | 10 | 30 | | | |
| | Preparation Example 12 | | | | 7 | | |
| | Preparation Example 13 | | | | | 12 | |
| | Preparation Example 14 | | | | | | 10 |
| Multifunctional crosslinking agent | | 0.1 | 0.1 | 0.13 | 0.1 | 0.1 | 0.1 |
| Compatibility | | good | good | good | good | good | good |
| Endurance Reliability | | ○ | ○ | ○ | ○ | ○ | ○ |
| Uniformity of light transmission (light leakage) | | ⊙ | ⊙ | ⊙ | ⊙ | ⊙ | ⊙ |

TABLE 4

|  |  | Examples | | Comparative Examples | | | |
|---|---|---|---|---|---|---|---|
|  |  | 7 | 8 | 1 | 2 | 3 | 4 |
| (A) Acrylic copolymer | Preparation Example 1 | 100 |  | 100 | 100 | 100 | 100 |
|  | Preparation Example 2 |  |  |  |  |  |  |
|  | Preparation Example 3 |  | 100 |  |  |  |  |
| (B) Optically anisotropic compound | Preparation Example 15 | 15 |  |  |  |  |  |
|  | Preparation Example 16 |  | 20 |  |  |  |  |
|  | Preparation Example 17 |  |  |  |  |  | 7 |
|  | Preparation Example 10 |  |  |  | 3 | 35 |  |
| Multifunctional crosslinking agent |  | 0.1 | 0.1 | 0.1 | 0.1 | 0.1 | 0.1 |
| Compatibility |  | good | good | good | good | Crystallization | Crystallization |
| Endurance Reliability |  | ○ | ○ | ○ | ○ | Δ | X |
| Uniformity of light transmission (light leakage) |  | ◎ | ◎ | X | Δ | Δ | X |

As can be seen from results shown in Tables 3 and 4, in Examples 1 to 8 according to the present invention, compatibility, endurance reliability, and uniformity of light transmission (light leakage) are excellent. On the other hand, when an optically anisotropic compound was not added as in Comparative Example 1, uniformity of light transmission is poor, resulting in light leakage. In Comparative Example 2, in spite of good compatibility, the content of the optically anisotropic compound used in the present invention was small, thereby leading to unsatisfactory performance in uniformity of light transmission. In Comparative Example 3, the optically anisotropic compound was used in an excessive content. As a result, there is some problem in endurance reliability, crystallization occurs in the pressure-sensitive adhesive layer, and positive birefringence resulting from the pressure-sensitive adhesive increases, thereby causing the light leakage phenomenon. In Comparative Example 4, when a compound having a substituent in a para position, which was prepared in Preparation Example 17, was added, a large amount of crystallization occurs in the pressure-sensitive adhesive layer, resulting in poor endurance reliability and poor uniformity of light transmission.

TABLE 5

|  |  | Examples | | | | | |
|---|---|---|---|---|---|---|---|
|  |  | 9 | 10 | 11 | 12 | 13 | 14 |
| (A) Acrylic copolymer | Preparation Example 4 | 100 |  |  | 100 |  |  |
|  | Preparation Example 5 |  | 100 |  |  | 100 |  |
|  | Preparation Example 6 |  |  | 100 |  |  | 100 |
| (B) Optically anisotropic compound | Preparation Example 10 | 3 |  |  |  |  |  |
|  | Preparation Example 11 |  | 20 |  |  |  |  |
|  | Preparation Example 12 |  |  | 0.5 |  |  |  |
|  | Preparation Example 13 |  |  |  | 15 |  |  |
|  | Preparation Example 14 |  |  |  |  | 5 |  |
|  | Preparation Example 15 |  |  |  |  |  | 2 |
| Crosslinking agent |  | 0.1 | 0.1 | 0.1 | 0.1 | 0.1 | 0.1 |
| Compatibility |  | good | good | good | good | good | good |
| Endurance Reliability |  | ○ | ○ | ○ | ○ | ○ | ○ |
| Uniformity of light transmission (light leakage) |  | ◎ | ◎ | ◎ | ◎ | ◎ | ◎ |

TABLE 6

|  |  | Example | Comparative Examples | | | | |
|---|---|---|---|---|---|---|---|
|  |  | 15 | 5 | 6 | 7 | 8 | 9 | 10 |
| (A) Acrylic copolymer | Preparation Example 4 | 100 |  | 100 | 100 |  |  |  |
|  | Preparation Example 5 |  |  |  |  |  |  | 100 |
|  | Preparation Example 7 |  |  |  |  | 100 |  |  |
|  | Preparation Example 8 |  |  |  |  |  | 100 |  |

TABLE 6-continued

|  |  | Example | Comparative Examples |  |  |  |  |  |
|---|---|---|---|---|---|---|---|---|
|  |  | 15 | 5 | 6 | 7 | 8 | 9 | 10 |
| (B) Optically anisotropic compound | Preparation Example 9 |  | 100 |  |  |  |  |  |
|  | Preparation Example 10 |  |  |  |  | 1 | 1 |  |
|  | Preparation Example 11 |  |  | 0.2 | 25 |  |  |  |
|  | Preparation Example 16 | 5 |  |  |  |  |  |  |
|  | Preparation Example 17 |  |  |  |  |  |  | 5 |
| Crosslinking agent |  | 0.1 | 0.1 | 0.1 | 0.1 | 0.1 | 0.1 | 0.1 |
| Compatibility |  | good | good | good | good | good | good | Crystallization |
| Endurance Reliability |  | ○ | ○ | ○ | ○ | ○ | ○ | X |
| Uniformity of light transmission (light leakage) |  | ◎ | X | Δ | Δ | Δ | Δ | X |

As can be seen from results shown in Tables 5 and 6, in Examples 9 to 15 according to the present invention, compatibility, endurance reliability, and uniformity of light transmission (light leakage) are good. On the other hand, as in Comparative Example 5, when an optically anisotropic compound was not added, light leakage occurs due to poor uniformity of light transmission. In Comparative Example 6, in spite of good compatibility, the content of the optically anisotropic compound used in the present invention was small, thereby leading to unsatisfactory performance in uniformity of light transmission. In Comparative Example 7, the optically anisotropic compound was used in an excessive amount, whereby the positive birefringence of the pressure-sensitive adhesive increases under residual stress and thus light leakage becomes severe. In Comparative Example 8, the content of aromatic acrylic ester is small, resulting in light leakage. In Comparative Example 9, aromatic acrylic ester is used in an excessive amount, whereby the positive birefringence of the pressure-sensitive adhesive increases under residual stress and thus light leakage becomes severe. In Comparative Example 10, when a compound having a substituent in a para position, which was prepared in Preparation Example 17, was added, a large amount of crystallization occurs in the pressure-sensitive adhesive layer, thereby resulting in poor endurance reliability and poor uniformity of light transmission.

The invention claimed is:

1. An acrylic pressure-sensitive adhesive composition, comprising:

(A) 100 parts by weight of acrylic copolymer; and (B) 5 to 30 parts by weight of an optically anisotropic compound comprising one or more substituents containing one of an alkyl group, an alkenyl group, and an alkynyl group in a meta position of mesogen expressed by Formula 2:

[Formula 2]

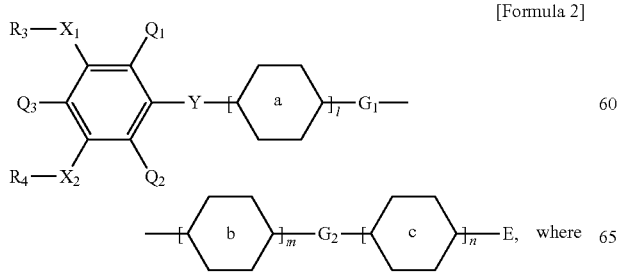

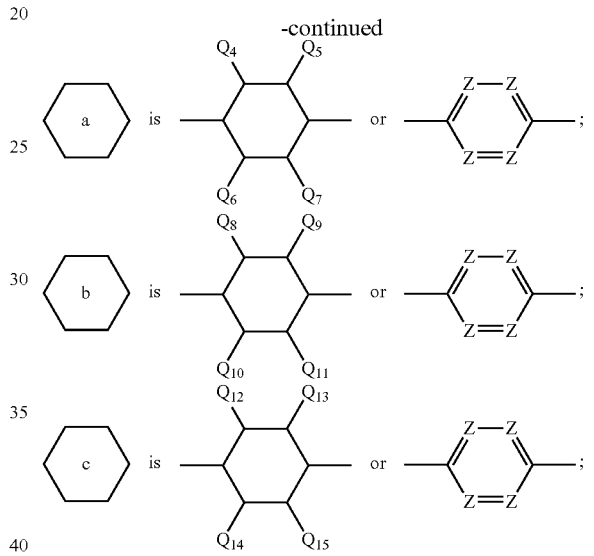

Z is C—W or N;

$Q_1$ through $Q_{15}$, and W are, independently of one another, hydrogen, halogen, cyano, —$R_5$, —$OR_5$, —$NR_5R_5$ or —C(=O)$R_5$, respectively; and l, m, and n are, independently of one another, an integer of 0 to 3, and l+m+n is an integer of 1 or over; and Y, $G_1$, $G_2$, $X_1$, and $X_2$ are, independently of one another, a single bond, —O—, —S—, —SO—, —$SO_2$—, $C_1$-$C_6$ alkylene, $C_2$-$C_6$ alkenylene, $C_2$-$C_6$ alkynylene, or —U-T-V—, respectively, wherein -T- indicates carbonyl (—C(=O)—), U and V indicate a single bond, —O—, —$NR_5$—, —S—, —$(CH_2)_p$—, —$O(CH_2)_p$—, —$(CH_2)_pO$—, respectively, and p indicates an integer of 1 to 5;

E indicates hydrogen, halogen, cyano, —NCO, —NCS, —$R_5$, or —$OR_5$; and $R_3$, $R_4$, and $R_5$, indicate, independently of one another, hydrogen, $C_1$-$C_{20}$ alkyl unsubstituted or substituted with one or more halogens, $C_2$-$C_{20}$ alkenyl unsubstituted or substituted with one or more halogens, $C_2$-$C_{20}$ alkynyl unsubstituted or substituted with one or more halogens, or —$(R_6O)_qR_7$, in which $R_6$ indicates $C_1$-$C_6$ alkylene, $R_7$ indicates $C_1$-$C_4$ alkyl, and q indicates an integer of 1 to 5, where both of $R_3$ and $R_4$ are not hydrogen at the same time;

with the proviso that at least two of l, m and n is more than 0 and at least one of $G_1$ and $G_2$ is —O—, —$NR_5$—, —S—, —SO—, —$SO_2$—, $C_1$-$C_6$ alkylene, $C_2$-$C_6$ alkenylene, $C_2$-$C_6$ alkynylene, or —U-T-V—, respectively.

2. The acrylic pressure-sensitive adhesive composition of claim 1, wherein the acrylic copolymer (A) is an aromatic group-containing acrylic copolymer.

3. The acrylic pressure-sensitive adhesive composition of claim 2, wherein the aromatic group-containing acrylic copolymer comprises:
 i) a (meth)acrylic acid ester monomer having an alkyl group of 1 to 14 carbon atoms;
 ii) a crosslinking functional group-containing monomer; and
 iii) an aromatic group-containing acrylic monomer that can be copolymerized with the (meth)acrylic acid ester monomer.

4. The acrylic pressure-sensitive adhesive composition of claim 3, wherein the aromatic group-containing acrylic monomer iii) is a compound expressed by Formula 1:

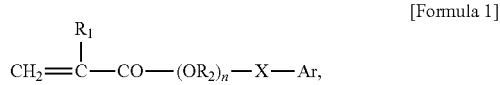

[Formula 1]

where $R_1$ indicates hydrogen or a methyl group,
$R_2$ indicates an alkylene group of 1 to 12 carbon atoms,
n indicates an integer of 0 to 3,
X indicates oxygen, sulfur, or an alkylene group of 1 to 4 carbon atoms, and
Ar indicates an aromatic group unsubstituted or substituted with halogen or alkyl of 1 to 12 carbon atoms.

5. The acrylic pressure-sensitive adhesive composition of claim 4, wherein the compound expressed by Formula 1 is one or more selected from the group consisting of phenoxy ethyl (meth)acrylate, benzyl (meth)acrylate, 2-phenylthio-1-ethyl (meth)acrylate, 6-(4,6-dibromo-2-isoprophyl phenoxy)-1-hexyl (meth)acrylate, 6-(4,6-dibromo-2-sec-butyl phenoxy)-1-hexyl (meth)acrylate, 2,6-dibromo-4-nonylphenyl (meth)acrylate, 2,6-dibromo-4-dodecyl phenyl (meth)acrylate, 2-(1-naphtyloxy)-1-ethyl (meth)acrylate, 2-(2-naphtyloxy)-1-ethyl (meth)acrylate, 6-(1-naphtyloxy)-1-hexyl (meth)acrylate, 6-(2-naphtyloxy)-1-hexyl (meth)acrylate, 8-(1-naphtyloxy)-1-octyl (meth)acrylate, and 8-(2-naphtyloxy)-1-octyl (meth)acrylate.

6. The acrylic pressure-sensitive adhesive composition of claim 1, wherein in the compound expressed by Formula 2, Y, $G_1$, and $G_2$ are, independently of one another, a single bond, —O—, $NR_5$, —S—, —SO—, —$SO_2$—, —$(CH_2)_p$—, —CH=CH—, —C≡C—, —C(=O)O—, —OC(=O)—, —C(=O)—, C(=O)$NR_5$, $NR_5$C(=O), —C(=O)S—, —SC(=O)—, —C(=O)O$(CH_2)_p$—, —OC(=O)$(CH_2)_p$—, —$(CH_2)_p$OC(=O)—, or —$(CH_2)_p$C(=O)O—, respectively, and p indicates an integer of 1 to 5.

7. The acrylic pressure-sensitive adhesive composition of claim 1, wherein in the compound expressed by Formula 2,
$G_1$ and $G_2$ are, independently of each another, a single bond, —CH=CH—, or respectively.

8. The acrylic pressure-sensitive adhesive composition of claim 1, wherein in the compound expressed by Formula 2, $X_1$ and $X_2$ are, independently of each other, a single bond, —O—, $NR_5$, —S—, —SO—, —$SO_2$—, —$(CH_2)_p$—, C(=O)$NR_5$, $NR_5$C(=O), $NR_5$C(=O) $NR_5$, —C(=O)O—, —OC(=O)—, or —OC(=O)O—, respectively, and p indicates an integer of 1 or 2.

9. The acrylic pressure-sensitive adhesive composition of claim 1, wherein in the compound expressed by Formula 2, $R_3$ and $R_4$ are $C_3$-$C_{12}$ alkyl unsubstituted or substituted with one or more halogens, $C_3$-$C_{12}$ alkenyl unsubstituted or substituted with one or more halogens, or linear or branch $C_3$-$C_{12}$ alkynyl unsubstituted or substituted with one or more halogens, respectively.

10. The acrylic pressure-sensitive adhesive composition of claim 1, wherein in the compound expressed by Formula 2, $R_3$, $R_4$, and $R_5$ are, independently of one another, —$(CH_2CH_2O)_qCH_3$, —$(CH_2CHCH_3O)_qCH_3$, or —$(CHCH_3CH_2O)_qCH_3$, respectively, and q indicates an integer of 1 to 5.

11. The acrylic pressure-sensitive adhesive composition of claim 1, further comprising (C) a low molecular weight material having a weight average molecular weight of 1,000 to 30,000 or a plasticizer.

12. The acrylic pressure-sensitive adhesive composition of claim 11, wherein the plasticizer (C) is one or more selected from the group consisting of a phthalic acid-based plasticizer, a fatty acid ester-based plasticizer, a phosphoric ester-based plasticizer, an epoxy-based plasticizer, a trimellitate-based plasticizer, a pyromellitate-based plasticizer, a benzoic acid-based plasticizer, a polyester-based plasticizer, and a sulfonic acid ester-based plasticizer.

13. The acrylic pressure-sensitive adhesive composition of claim 1, further comprising a multifunctional crosslinking agent.

14. The acrylic pressure-sensitive adhesive composition of claim 13, wherein the multifunctional crosslinking agent is one or more kinds selected from the group consisting of an isocyanate compound, an epoxy compound, an aziridine compound, and a metal chelate compound.

15. The acrylic pressure-sensitive adhesive composition of claim 13, wherein the content of the multifunctional crosslinking agent is 0.01 to 5 parts by weight based on 100 parts by weight of the acrylic copolymer (A).

16. A polarizer comprising:
 a polarization film; and
 a pressure-sensitive adhesive layer formed on one side or both sides of the polarization film and containing the pressure-sensitive adhesive composition according to claim 1.

17. A liquid crystal display (LCD) device comprising a liquid crystal panel in which the polarizer according to claim 16 is attached onto one side or both sides of a liquid crystal cell.

* * * * *